United States Patent Office.

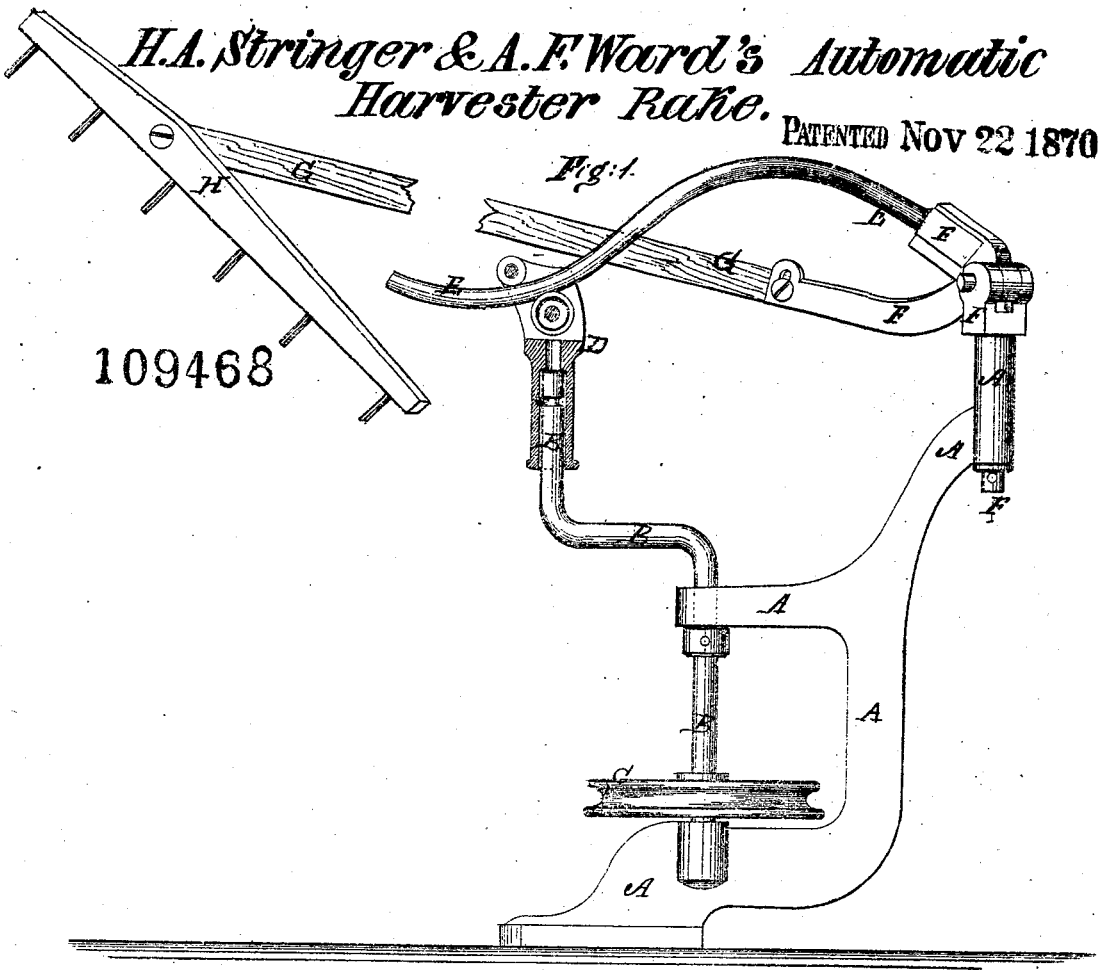
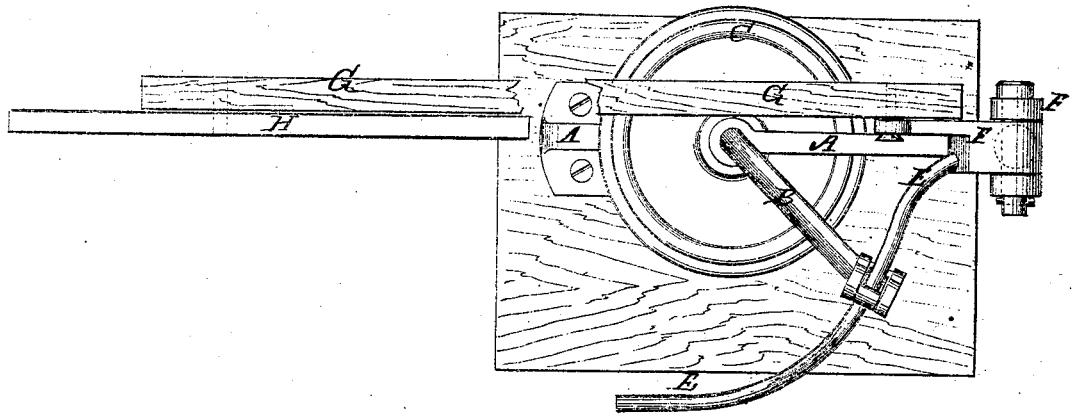

HUGH ARBUTHNOTT STRINGER AND ALEXANDER FIELD WARD, OF CHATHAM, CANADA.

Letters Patent No. 109,468, dated November 22, 1870.

IMPROVEMENT IN HARVESTER-RAKES.

The Schedule referred to in these Letters Patent and making part of the same.

*To all whom it may concern:*

Be it known that we, HUGH ARBUTHNOTT STRINGER and ALEXANDER FIELD WARD, of Chatham, in the county of Kent and Province of Ontario, Dominion of Canada, have invented a new and useful Improvement in Automatic Harvester-Rake; and we do hereby declare that the following is a full, clear, and exact description thereof, which will enable others skilled in the art to make and use the same, reference being had to the accompanying drawing forming part of this specification, in which—

Figure 1 is a side view of our improved rake-attachment for harvesters.

Figure 2 is a top view of the same.

Similar letters of reference indicate corresponding parts.

Our invention has for its object to furnish an improved automatic raking-attachment for reapers which shall be simple in construction, effective in operation, and, at the same time, compact and not liable to get out of order; and It consists in the construction and combination of various parts of the attachment, as hereinafter more fully described.

A is a bracket, which may be made in the shape and manner shown in fig. 1, or in any other convenient form, and which is securely bolted to the platform or frame-work of the harvester.

B is the crank, the lower part of which revolves in bearings in the lower part of the bracket A, as shown in fig. 1, and has a chain-wheel, C, attached to it, to receive the chain by which it is driven.

To the upper end of the upper part of the crank B is swiveled a head, D, the upper end of which is slotted, to receive the guide-rod E, and has one or two friction-rollers pivoted in it, to diminish the friction of the said rod E.

The rod E is curved into about the form shown in figs. 1 and 2, and its end is attached to the upper part of the hinged head F, the lower part or spindle of which is swiveled to the upper end of the bracket A.

To the upper part of the head F is bolted the rake-handle G, the outer bolt passing through a slot, so that the pitch or inclination of the rake-handle may be adjusted as required.

H is the rake-head, which is attached to the outer end of the handle G, at such an inclination as to sweep across and in a line parallel with the platform.

By this construction, as the crank B is revolved by the chain-wheel C, its swiveled head moves back and forth along the curved rod E, which curved rod, by its peculiar form, causes the rake-head to sweep the grain from the platform, and then rise, move back, and descend, to sweep another gavel from the platform.

The harvester will, in practice, be provided with the usual attachments for changing the speed of the rake, and starting and stopping it, as required.

Having thus described our invention,

We claim as new and desire to secure by Letters Patent—

The crank B, provided with a swiveled head, and the curved guide-rod E, provided with a hinged and swiveled head, in combination with each other, and with the driving-gearing and rake of a harvester, substantially as herein shown and described, and for the purpose set forth.

HUGH ARBUTHNOTT STRINGER.
ALEXANDER FIELD WARD.

Witnesses:
JNO. F. DELMAGE,
EDWARD SMITH,
*Both of the Town of Chatham, Ontario*